(12) United States Patent
Vihriälä

(10) Patent No.: US 7,489,734 B2
(45) Date of Patent: Feb. 10, 2009

(54) EQUALIZATION IN RADIO RECEIVER

(75) Inventor: Jaakko Vihriälä, Oulu (FI)

(73) Assignee: Nokia Corporation, Espoo (FI)

( * ) Notice: Subject to any disclaimer, the term of this patent is extended or adjusted under 35 U.S.C. 154(b) by 587 days.

(21) Appl. No.: 11/320,568

(22) Filed: Dec. 30, 2005

(65) Prior Publication Data

US 2007/0104282 A1     May 10, 2007

(30) Foreign Application Priority Data

Nov. 10, 2005   (FI) .................................. 20055602

(51) Int. Cl.
*H04K 1/10*    (2006.01)
*H03D 1/04*    (2006.01)

(52) U.S. Cl. ........................................ 375/260; 375/346

(58) Field of Classification Search .................. 375/229, 375/331, 332, 260, 346; 708/322, 323
See application file for complete search history.

(56) References Cited

U.S. PATENT DOCUMENTS

| 6,925,112 B1 * | 8/2005 | Morejon et al. ............. 375/222 |
| 2001/0033614 A1 * | 10/2001 | Hudson ....................... 375/229 |
| 2004/0021795 A1 * | 2/2004 | Kim ............................ 348/607 |
| 2004/0142665 A1 * | 7/2004 | Papathanasion et al. ..... 455/101 |
| 2006/0023799 A1 * | 2/2006 | Kang et al. .................. 375/260 |
| 2006/0039459 A1 * | 2/2006 | Kolze et al. ................. 375/232 |

* cited by examiner

*Primary Examiner*—Young T. Tse
(74) *Attorney, Agent, or Firm*—Squire, Sanders & Dempsey, L.L.P.

(57) ABSTRACT

A solution for equalization in a radio receiver is provided. According to the provided solution, equalization with a zero forcing equalization algorithm is improved with frequency domain processing of received information symbols. The frequency spectrum of received information symbols is modified with a calculated frequency domain representation of the radio channel impulse response. Thereafter, the information symbols having the modified frequency spectrum are filtered with a zero forcing filter having the filter coefficients calculated through a zero forcing algorithm.

24 Claims, 2 Drawing Sheets

EQUALIZATION IN RADIO RECEIVER

FIELD

The invention relates in general to radio telecommunications and particularly to equalization in a radio receiver.

BACKGROUND

As the bandwidth of a telecommunication signal increases, inter-symbol interference caused by frequency selectivity of a radio channel becomes a limiting factor when considering the reliability of a data transfer. The frequency selectivity is caused by multipath propagation of a telecommunication signal in the radio channel resulting in arrival of different transmitted signal components at a radio receiver at different time instants. The time difference between the time instants at which the first and the last signal components arrive at the receiver is called a delay spread. When the delay spread is higher than a symbol duration, inter-symbol interference occurs. In order to mitigate the effects of inter-symbol interference on reliable data detection, several types of equalizers have been developed.

An equalizer based on a "zero forcing" algorithm is a widely used, low-complexity equalizer which aims to eliminate the inter-symbol interference at decision time instants, i.e. at the center of the bit or symbol interval. The zero forcing equalizer may be realized, for example, with a transversal digital filter whose filter coefficients are calculated from the radio channel impulse response such that the output of the filter has a value (unity, for example) at the decision time instant and zero otherwise. The zero forcing equalizer actually attempts to counter the frequency selectivity of the radio channel by compensating the attenuation of the telecommunication signal at certain frequencies. This leads to a drawback associated with the zero forcing equalizer. If the radio channel frequency response has spectral nulls in its frequency spectrum, the zero forcing equalizer gives an amplification rising to infinity to these frequencies. This results in drastic amplification of noise at these frequencies and, thus, degradation in the performance of the equalizer.

Frequency domain equalizers transform a received telecommunication signal and a radio channel impulse response into a frequency domain. The frequency spectrum of the telecommunication signal is then weighted in the frequency domain with the frequency spectrum of the radio channel in order to compensate for the frequency attenuations caused by the radio channel. There exist a number of algorithms for carrying out the weighting. A problem with the frequency domain equalizers is that they are complex equalization methods consuming high amounts of computational resources. In particular, the frequency domain equalizers calculate a high amount of divisions which consume a substantial amount of computational resources particularly in ASIC (Application Specific Integrated Circuit) implementations in which the silicon area is a very limited resource.

BRIEF DESCRIPTION OF THE INVENTION

An object of the invention is to provide an improved solution for equalization in a radio receiver.

According to an aspect of the invention, there is provided an equalization method in a radio receiver. The method comprises receiving a plurality of information symbols, determining a radio channel impulse response from the received information symbols, calculating filter coefficients for an equalization filter with a zero forcing algorithm on the basis of the radio channel impulse response, and calculating a frequency domain representation of the radio channel impulse response. The method further comprises modifying a frequency spectrum of at least a portion of the received plurality of information symbols with the frequency domain representation of the radio channel impulse response, and filtering the information symbols having the modified frequency spectrum with the equalization filter having the calculated filter coefficients.

According to another aspect of the invention, there is provided a radio receiver comprising a communication interface for receiving radio signals comprising a plurality of information symbols and a processing unit. The processing unit is configured to determine a radio channel impulse response from the received information symbols, calculate filter coefficients for an equalization filter with a zero forcing algorithm on the basis of the radio channel impulse response, and calculate a frequency domain representation of the radio channel impulse response. The processing unit is further configured to modify a frequency spectrum of at least a portion of the received plurality of information symbols with the frequency domain representation of the radio channel impulse response and filter the information symbols having the modified frequency spectrum with the zero forcing filter having the calculated filter coefficients.

According to another aspect of the invention, there is provided a computer program product embodied on a computer readable medium, the computer program product encoding a computer program of instructions for executing a computer process for equalization in a radio receiver. The process comprises receiving a plurality of information symbols, determining a radio channel impulse response from the received information symbols, calculating filter coefficients for an equalization filter with a zero forcing algorithm on the basis of the radio channel impulse response, and calculating a frequency domain representation of the radio channel impulse response. The method further comprises modifying a frequency spectrum of at least a portion of the received plurality of information symbols with the frequency domain representation of the radio channel impulse response, and filtering the information symbols having the modified frequency spectrum with the equalization filter having the calculated filter coefficients.

According to another aspect of the invention, there is provided a computer program distribution medium readable by a computer and encoding a computer program of instructions for executing a computer process for equalization in a radio receiver. The process comprises receiving a plurality of information symbols, determining a radio channel impulse response from the received information symbols, calculating filter coefficients for an equalization filter with a zero forcing algorithm on the basis of the radio channel impulse response, and calculating a frequency domain representation of the radio channel impulse response. The method further comprises modifying a frequency spectrum of at least a portion of the received plurality of information symbols with the frequency domain representation of the radio channel impulse response, and filtering the information symbols having the modified frequency spectrum with the equalization filter having the calculated filter coefficients.

An advantage the invention provides is a good equalization performance with a decreased complexity. In particular, no divisions are needed in the equalization process, which is advantageous particularly in ASIC implementations due to the decreased amount of the silicon area consumed by the equalization filter.

LIST OF DRAWINGS

In the following, the invention will be described in greater detail with reference to the embodiments and the accompanying drawings, in which FIG. 1 illustrates a radio receiver according to an embodiment of the invention;

DESCRIPTION OF EMBODIMENTS

Figure 1:
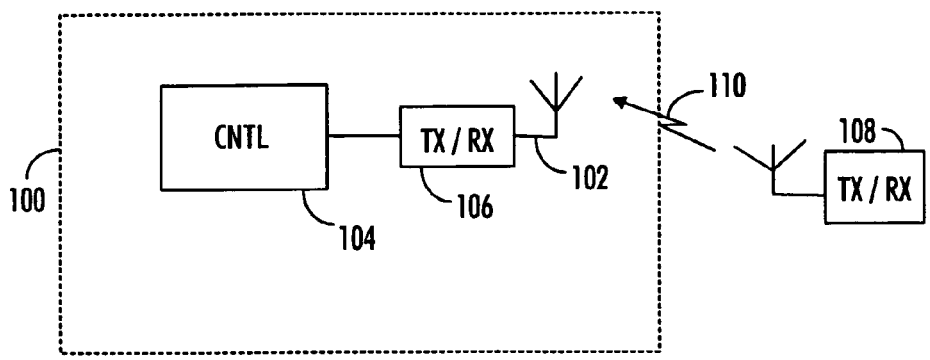

With reference to FIG. 1, let us examine an example of a radio receiver 100 in which embodiments of the invention can be implemented. The radio receiver 100 may be a communication device capable of transmitting and receiving radio telecommunication signals or a communication device capable of only receiving such signals. The radio receiver 100 may belong to a telecommunication system and, thus, be a subscriber unit or a network element, such as a base station of the telecommunication system. The telecommunication system may be, for example, a spread spectrum communication system.

The radio receiver 100 comprises a communication interface 106 to receive radio signals transmitted over a communication link 110 from a radio transmitter 108. The communication interface 106 may also be arranged to transmit radio signals. The communication interface may comprise an antenna 102 and radio frequency (RF) components, such as a radio frequency filter, an amplifier, etc.

The radio receiver 100 further comprises a processing unit 104 to control functions of the radio receiver 100. The processing unit 104 handles establishment, operation and termination of radio connections in the radio receiver 100. Additionally, the processing unit 104 controls reception of information by controlling the processing of received radio signals. The processing unit 104 may be implemented by a digital signal processor with suitable software embedded in a computer readable medium, or by separate logic circuits, for example with ASIC (Application Specific Integrated Circuit).

The radio receiver 100 may optionally further comprise other components connected to the processing unit 104, such as a user interface and one or more memory devices. These components do not, however, limit the invention in any way and are thus not described in more detail.

Figure 2:
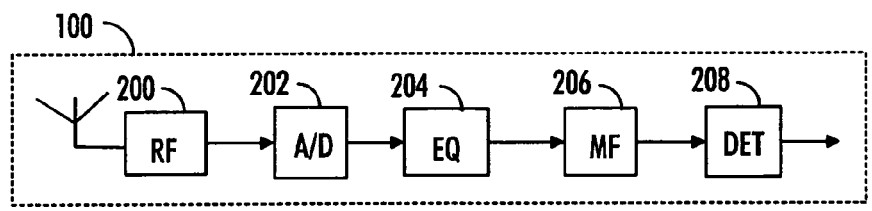
FIG. 2 illustrates a functional block diagram of a part of a radio receiver according to an embodiment of the invention.

FIG. 2 illustrates a functional block diagram of a part of the radio receiver 100 according to an embodiment of the invention. When a radio signal comprising information symbols is received in the radio receiver, the receiver radio signal is first processed in the RF components 200 of the radio receiver. In the RF components 200, the radio frequency information symbols are filtered, amplified, and converted to a base band. The base band analog information symbols are then converted into a digital form in an analog-to-digital (A/D) converter 202.

After the A/D conversion, inter-symbol interference (ISI) in the received information symbols is mitigated in an equalizer 204. The equalizer 204 may comprise an adaptive digital filter which adjusts its parameters according to changing properties of a radio channel. The operation of the equalizer according to an embodiment of the invention is described in more detail later in conjunction with FIG. 3. After equalization, the equalized information symbols are demodulated in a matched filter 206 (or in an equivalent demodulator) and the demodulated information symbols are detected in a detector 208. After detection of the information symbols, the information symbols may be converted into information bits for further processing. In addition to the operations described above, the radio receiver 100 may comprise other components which process the received information symbols. For example, if the received information symbols have been spread with a spreading code, the spread information symbols may be despread before data detection. The radio receiver 100 may also comprise additional signal processing in order to mitigate, for example, multiple access interference caused by another user of the same frequency band.

Next equalization according to an embodiment of the invention will be described with reference to FIG. 3. The equalizer 204 may be considered as a modified zero forcing equalizer which utilizes operations of a conventional equalizer based on a zero forcing algorithm but which overcomes the draw-backs of the conventional zero forcing algorithm. The information symbols received in the radio receiver 100 may comprise data symbols and control symbols. The data symbols may carry payload information and the control symbols may carry information which may be used in order to facilitate efficient processing of the data symbols. The control symbols may comprise, for example, a training sequence which may be used for adjusting the equalizer parameters according to the changing radio and interference environment. The training sequence may comprise, for example, pilot symbols known to the radio receiver 100. A received information symbol vector may be described as:

$$r = [r_1 \ r_2 \ldots r_n]^T, \quad (1)$$

in which $$r_n = \sum_{m=1}^{L} b_{n-m} h_m + z_n, \quad (2)$$

where $r_n$ is the $n^{th}$ received information symbol (n=1, ..., N), b is a transmitted information symbol, h is a radio channel impulse response, L denotes the length of the radio channel impulse response, and z represents noise introduced to the transmitted signal in the radio channel. If the received information symbol vector r consists of training sequence symbols, the transmitted information symbols b are known to the radio receiver 100 and the radio receiver may estimate the radio channel impulse response h. If the received information symbol vector r consists of data symbols, the estimated radio channel impulse response h may be used to facilitate the detection of the data symbols.

Figure 3:
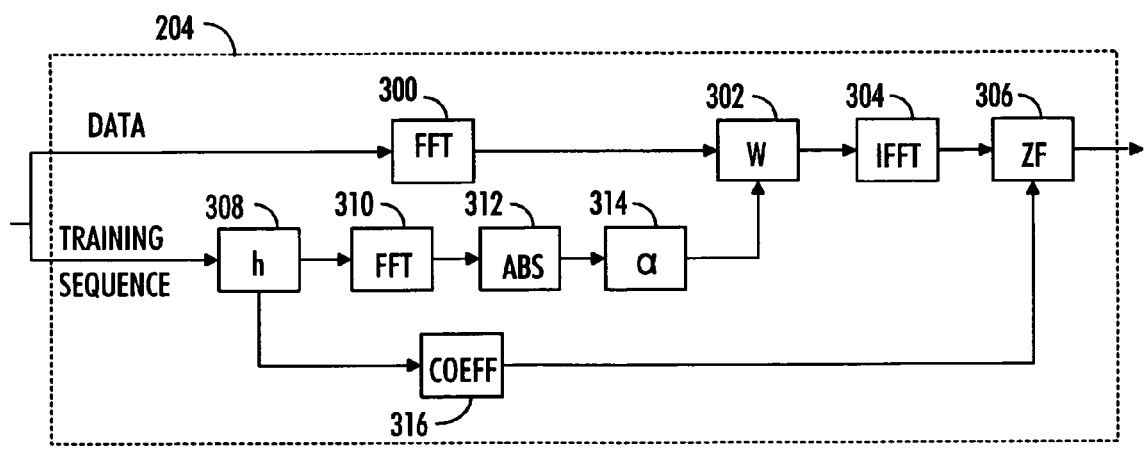
FIG. 3 illustrates a functional block diagram of an equalizer according to an embodiment of the invention.

Referring to FIG. 3, which describes the operations carried out in the equalization process, a radio channel impulse response is first determined in block 308. The radio channel impulse response may be determined from the received training sequence according to a procedure known in the art. From the determined impulse response, coefficients for filtering operation may be calculated according to a conventional zero forcing algorithm in block 316. Coefficients for a conventional zero forcing equalization filter may be defined in a vector form as:

$$w_{ZF}=(Q^H Q)^{-1} Q^H 1, \quad (3)$$

where H denotes complex conjugate transpose of a matrix, and Q and 1 are defined as:

$$Q = \begin{bmatrix} h_1 & 0 & \cdots & 0 & 0 \\ \vdots & h_1 & \cdots & 0 & 0 \\ h_L & \vdots & \cdots & h_1 & 0 \\ 0 & h_L & \cdots & \vdots & h_1 \\ 0 & 0 & \cdots & h_L & \vdots \\ 0 & 0 & \cdots & 0 & h_L \end{bmatrix} \quad (4)$$

and $$1 = \begin{bmatrix} \underbrace{0 \ \cdots \ 0}_{K} & 1 & \underbrace{0 \ \cdots \ 0}_{K} \end{bmatrix}^T, \quad (5)$$

where K denotes the number of filter coefficients (or filter taps) before or after the optimal sampling instant. Thus, the total length of the zero forcing filter is 2K+1.

Before the actual filtering of the data symbols, a number of operations are carried out with respect to the data symbols and the determined radio channel impulse response. A received data symbol vector r and the determined radio channel impulse response vector h are transformed into the frequency domain in blocks 300 and 310, respectively. The transform into the frequency domain may be carried out by processing the vectors r and h with a fast Fourier transform (FFT) algorithm. Consequently, a frequency domain representation R of the data symbol vector r and the frequency response H of the radio channel are obtained. Both R and H are vectors. The radio channel frequency response H is further processed by taking, in block 312, an absolute value from each element of the vector H, thus obtaining an amplitude spectrum of the radio channel.

The amplitude spectrum of the radio channel is then modified with an adjustment parameter α which is an exponent of the amplitude spectrum. Accordingly, the adjustment parameter scales the amplitude spectrum of the radio channel. This modification is carried out in block 314. The adjustment parameter α will be described in more detail later.

After the amplitude spectrum of the radio channel has been modified with the adjustment parameter α, the frequency domain representation R of the data symbols are weighted with the modified amplitude spectrum of the radio channel in block 302. The weighted frequency domain representation of the data symbols is then transformed back into the time domain in block 304. The inverse transform may be carried out by processing the weighted frequency domain representation of the data symbols with an inverse FFT algorithm. Accordingly, weighted data symbols are obtained. The weighted data symbols are then filtered with a zero forcing filter 306 whose coefficients are determined in block 316 as described above.

The output of the equalizer 204 comprises data symbols with mitigated ISI. The output of the equalizer 204 may also be described with the following mathematical expression:

$$b_{ZF}=IFFT(R \times |H|^\alpha)*w_{ZF}, \quad (6)$$

where x denotes the Schur product, |•| denotes an absolute value, α is the adjustment parameter, * denotes convolution, and $w_{ZF}$ is a vector comprising the calculated coefficients for the zero forcing filter. In the Schur product, the corresponding elements of two same-size vectors or matrices are multiplied together.

As equation (6) indicates, the adjustment parameter α defines how strongly the frequency domain representation of the data symbols is modified with the amplitude spectrum of the radio channel. Advantageously, the adjustment parameter may have values between zero and one. According to an embodiment of the invention, the adjustment parameter has, however, values above zero. This is due to that if the adjustment parameter is zero, the modified amplitude spectrum of the radio channel becomes a constant of one and the frequency domain representation of the data symbols remains the same after the weighting. Consequently, the equalization process would reduce to a conventional zero forcing equalization. The value of the adjustment parameter a may be kept constant or it may be made varying. In the latter case, the value of the adjustment parameter α may be selected on the measured conditions of the radio channel. The value of the adjustment parameter α may be determined on the basis of the radio channel frequency response and/or signal-to-noise power ration (SNR) of the received signal. The grade of the radio channel and the corresponding values for the adjustment parameter α may be stored into a lookup table. When the properties affecting the selection of the adjustment parameter α have been determined, the proper value for the adjustment parameter may be selected from the lookup table, the proper value corresponding to the determined properties.

As mentioned above, the frequency domain representation of the data symbols is weighted with the modified (scaled) amplitude spectrum of the radio channel. The frequency domain representation of the data symbols comprises the frequency spectrum of the transmitted data symbols, which has been altered by the frequency selectivity of the radio channel, and the frequency spectrum of the noise which has a relatively flat spectrum. In a frequency selective radio channel, the frequency domain representation of the data symbols comprises strong attenuations in certain frequencies. Since the amplitude spectrum of the radio channel has been determined from the training sequence which has propagated through substantially the same radio channel as the data symbols, the amplitude spectrum of the radio channel has a form similar to the frequency spectrum of the data symbols. Thus, the attenuations occur at substantially the same frequencies in both cases. Now that the frequency spectrum of the data symbols is weighted with the amplitude spectrum of the radio channel, already attenuated frequencies are further attenuated. One reason for this is to attenuate noise on these frequencies. Further attenuation of signal components of the data symbols on the attenuated frequencies do not degrade the data symbols severely anymore but the attenuation of the noise on these frequencies compensates for the amplification of the noise caused by the filtering with the zero forcing filter. As described in the 'Background' section, the drawback of the zero forcing algorithm is that it amplifies noise on the frequencies in which the desired signal is severely attenuated. Therefore, this embodiment of the invention compensates for the amplification of the noise and, thus, improves the performance of the zero forcing equalization.

As can be seen from equation (6), the number of divisions in the calculation of this equalization algorithm is minimized, which results in an efficient utilization of computational resources, e.g. the silicon area, particularly in ASIC implementations.

Figure 4:
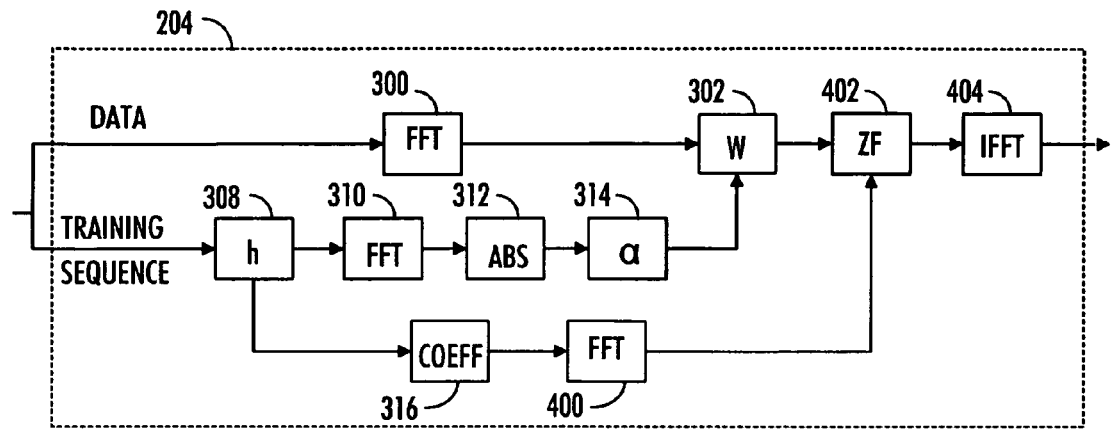
FIG. 4 illustrates another functional block diagram of an equalizer according to an embodiment of the invention.

FIG. 4 illustrates another embodiment of the invention. Components associated with the same reference numerals as in FIGS. 2 and 3 have the same functionalities as before. According to this embodiment, the filtering process is carried out in the frequency domain, thus avoiding calculation of convolutions. In case the delay spread of the radio channel is relatively long, it may be advantageous to use frequency domain processing instead of time domain processing. According to this embodiment of the invention, the frequency domain representation of the data symbols is again weighted with the radio channel amplitude spectrum which has been modified (scaled) with the adjustments parameter $\alpha$. The actual weighting (Schur product) is again carried out in block 302.

The coefficients for the zero forcing filter coefficients are calculated in block 316. Once the coefficients have been calculated, the coefficients are transformed into the frequency domain through FFT in block 400. The weighted frequency domain representation of the data symbols is again weighted, now in block 402 with the filter coefficients transformed into the frequency domain. The weighting is again carried out through the Schur product. This embodiment may be described with the following expression:

$$b_{ZF} = IFFT(R \times |H|^\alpha \times W_{ZF}),\quad (7)$$

where $W_{ZF}$ denotes a zero forcing filter coefficient vector $w_{ZF}$ which has been transformed into the frequency domain through FFT. After the filtering, the resulting filtered data symbols are transformed back into the time domain in block 404.

Figure 5:
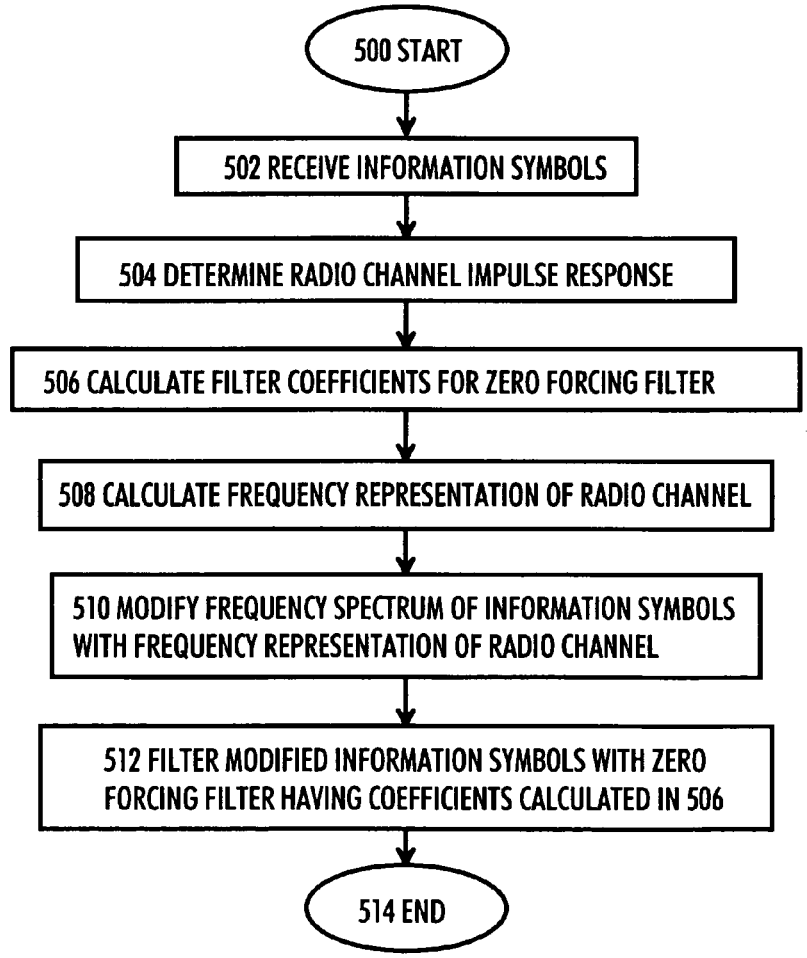
FIG. 5 is a flow diagram illustrating equalization process according to an embodiment of the invention.

Next, an equalization process in a radio receiver according to an embodiment of the invention will be described referring to the flow diagram in FIG. 5. The process starts in block 500.

In block 502, a plurality of information symbols is received in the radio receiver. The plurality of information symbols may be transmitted over a radio channel to the radio receiver. The plurality of information symbols may comprise data symbols and known training sequence symbols (pilot symbols, for example).

In block 504, a radio channel impulse response is determined from the received information symbols. The radio channel impulse response may be determined from the received training sequence symbols, for example. In addition to the radio channel impulse response, other parameters, such as SNR, may be determined from the received training sequence symbols.

In block 506, filter coefficients are calculated for a zero forcing filter on the basis of the determined radio channel impulse response. In block 508, a frequency representation of the radio channel is calculated. The frequency representation may be calculated from the determined radio channel impulse response. The frequency representation may be a scaled amplitude spectrum of the radio channel.

In block 510, the frequency spectrum of at least a portion of the received information symbols is modified with the frequency representation of the radio channel. Said at least one portion of the received information symbols may comprise data symbols to be detected in the radio receiver. The information symbols may be transformed into the frequency domain by processing the information symbols with a fast Fourier transform algorithm. Accordingly, the frequency spectrum of the information symbols is weighted with the frequency representation of the radio channel.

In block 512, the modified information symbols are filtered with a zero forcing filter whose coefficients were calculated in block 506. The filtering may be carried out in the time domain through convolution or in the frequency domain through multiplication between the modified information symbols and the filter coefficients. The process ends in block 514.

As described above, the embodiments of the invention may be realized in a radio receiver 100 comprising a communication interface 106 and a processing unit 104 operationally connected to the communication interface 106. The processing unit 104 may be configured to perform at least some of the steps described in connection with the flowchart of FIG. 5 and in connection with FIGS. 3 and 4. Although ASIC would be a typical implementation of the embodiments of the invention, the embodiments may also be implemented as a computer program comprising instructions for executing a computer process for equalization in the radio receiver 100.

The computer program may be stored on a computer program distribution medium readable by a computer or a processor. The computer program medium may be, for example but not limited to, an electric, magnetic, optical, infrared or semiconductor system, device or transmission medium. The medium may be a computer readable medium, a program storage medium, a record medium, a computer readable memory, a random access memory, an erasable programmable read-only memory, a computer readable software distribution package, a computer readable signal, a computer readable telecommunications signal, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. An equalization method in a radio receiver, the method comprising:
   receiving a plurality of information symbols;
   determining a radio channel impulse response from the received information symbols;
   calculating filter coefficients for an equalization filter with a zero forcing algorithm based on the radio channel impulse response;
   calculating a frequency domain representation of the radio channel impulse response;
   modifying a frequency spectrum of at least one portion of the received plurality of information symbols with the frequency domain representation of the radio channel impulse response; and
   filtering the information symbols having the modified frequency spectrum with the equalization filter having the calculated filter coefficients.

2. The method of claim 1, wherein the plurality of information symbols comprises a plurality of data symbols and a plurality of training sequence symbols.

3. The method of claim 2, further comprising:
   determining the radio channel impulse response from the training sequence symbols.

4. The method of claim 1, wherein the modifying of the frequency spectrum of the at least one portion of the received plurality of information symbols comprises attenuating the frequencies in which a power level of the information symbols is degraded due to frequency selectivity of a radio channel.

5. The method of claim 1, wherein the modifying of the frequency spectrum of the at least one portion of the received plurality of information symbols comprises:
   transforming the at least one portion of the received plurality of information symbols into a frequency domain;
   weighting the transformed at least one portion of the received plurality of information symbols with the calculated frequency domain representation of the radio channel impulse response, and inverse transforming the weighted at least one portion of the received plurality of information symbols back into a time domain.

6. The method of claim 5, wherein the transforming of the at least one portion of the received plurality of information symbols into the frequency domain comprises calculating a fast Fourier transform (FFT) of the at least one portion of the received plurality of information symbols, and the inverse transforming of the weighted at least one portion of the received plurality of information symbols into the time domain comprises calculating an inverse fast Fourier transform (IFFT) of the weighted at least one portion of the received plurality of information symbols.

7. The method of claim 1, wherein the calculating of the frequency domain representation of the radio channel impulse response comprises:

transforming the radio channel impulse response into the frequency domain to obtain a transformed radio channel frequency response;

calculating an absolute value of the transformed radio channel frequency response to obtain an amplitude spectrum of the radio channel; and modifying the amplitude spectrum of the radio channel with an adjustment parameter.

8. The method of claim 7, wherein modifying the amplitude spectrum comprises raising the amplitude spectrum to an exponent defined by the adjustment parameter.

9. The method of claim 1, wherein the filtering comprises calculating a convolution between the plurality of information symbols and the filter coefficients determined for the zero forcing algorithm.

10. The method of claim 1, wherein the filtering comprises multiplying a frequency domain representation of the modified at least one portion of the information symbols and a frequency domain representation of the filter coefficients determined for the zero forcing algorithm, and the method further comprising:

inverse transforming the filtered at least one portion of the information symbols into a time domain.

11. A radio receiver, comprising:

a communication interface for receiving radio signals comprising a plurality of information symbols and a processing unit configured to determine a radio channel impulse response from the received information symbols, calculate filter coefficients for an equalization filter with a zero forcing algorithm based on the radio channel impulse response, calculate a frequency domain representation of the radio channel impulse response, modify a frequency spectrum of at least one portion of the received plurality of information symbols with the frequency domain representation of the radio channel impulse response, and filter the information symbols having the modified frequency spectrum with the equalization filter having the calculated filter coefficients.

12. The radio receiver of claim 11, wherein the plurality of information symbols comprises a plurality of data symbols and a plurality of training sequence symbols.

13. The radio receiver of claim 12, wherein the processing unit is further configured to determine the radio channel impulse response from the training sequence symbols.

14. The radio receiver of claim 11, wherein the processing unit is further configured to modify the frequency spectrum of the at least one portion of the received plurality of information symbols by attenuating the frequencies in which a power level of the information symbols is degraded due to frequency selectivity of a radio channel.

15. The radio receiver of claim 11, wherein the processing unit is further configured to modify the frequency spectrum of the at least one portion of the received plurality of information symbols by transforming the at least one portion of the received plurality of information symbols into a frequency domain, weighting the transformed at least one portion of the received plurality of information symbols with the calculated frequency domain representation of the radio channel impulse response, and inverse transforming the weighted at least one portion of the received plurality of information symbols back into a time domain.

16. The radio receiver of claim 15, wherein the processing unit is further configured to transform the at least one portion of the received plurality of information symbols into the frequency domain by calculating a fast Fourier transform (FFT) of the transformed at least one portion of the received plurality of information symbols and to carry out the inverse transform of the weighted at least one portion of the received plurality of information symbols by calculating an inverse fast Fourier transform (IFFT) of the weighted at least one portion of the received plurality of information symbols.

17. The radio receiver of claim 11, wherein the processing unit is further configured to calculate the frequency domain representation of the radio channel impulse response by transforming the radio channel impulse response into a frequency domain to obtain a transformed radio channel frequency response, calculating an absolute value of the transformed radio channel frequency response to obtain an amplitude spectrum of the radio channel, and modifying the amplitude spectrum of the radio channel with an adjustment parameter.

18. The radio receiver of claim 17, wherein the processing unit is further configured to modify the amplitude spectrum by raising the amplitude spectrum to an exponent defined by the adjustment parameter.

19. The radio receiver of claim 11, wherein the processing unit is further configured to filter the information symbols by calculating a convolution between the plurality of information symbols and the filter coefficients determined for the zero forcing algorithm in a time domain.

20. The radio receiver of claim 11, wherein the processing unit is further configured to filter the information symbols by multiplying a frequency domain representation of the modified at least one portion of the information symbols and a frequency domain representation of the filter coefficients determined for the zero forcing algorithm, and inverse transform the filtered at least one portion of the information symbols into a time domain.

21. A radio receiver, comprising:

communication means for receiving radio signals comprising a plurality of information symbols;

means for receiving the plurality of information symbols;

means for determining a radio channel impulse response from the received information symbols;

means for calculating filter coefficients for an equalization filter with a zero forcing algorithm based on the radio channel impulse response;

means for calculating a frequency domain representation of the radio channel impulse response;

means for modifying a frequency spectrum of at least a portion of the received plurality of information symbols with the frequency domain representation of the radio channel impulse response; and means for filtering the information symbols having the modified frequency spectrum with the equalization filter having the calculated filter coefficients.

22. A computer program product embodied on a computer readable medium, the computer program product encoding a computer program of instructions for executing a computer process for equalization in a radio receiver, the process comprising:

receiving a plurality of information symbols;

determining a radio channel impulse response from the received information symbols;

calculating filter coefficients for an equalization filter with a zero forcing algorithm based on the radio channel impulse response;

calculating a frequency domain representation of the radio channel impulse response;

modifying a frequency spectrum of at least a portion of the received plurality of information symbols with the frequency domain representation of the radio channel impulse response; and filtering the information symbols having the modified frequency spectrum with the equalization filter having the calculated filter coefficients.

23. A computer program distribution medium readable by a computer and encoding a computer program of instructions for executing a computer process for equalization in a radio receiver, the process comprising:

receiving a plurality of information symbols;

determining a radio channel impulse response from the received information symbols;

calculating filter coefficients for an equalization filter with a zero forcing algorithm based on the radio channel impulse response;

calculating a frequency domain representation of the radio channel impulse response;

modifying a frequency spectrum of at least a portion of the received plurality of information symbols with the frequency domain representation of the radio channel impulse response; and filtering the information symbols having the modified frequency spectrum with the equalization filter having the calculated filter coefficients.

24. The computer program distribution medium of claim 23, wherein the distribution medium including at least one of the following media: a computer readable medium, a program storage medium, a record medium, a computer readable memory, a computer readable software distribution package, a computer readable signal, a computer readable telecommunications signal, and a computer readable compressed software package.

* * * * *